(12) United States Patent
Zhang et al.

(10) Patent No.: US 7,894,834 B1
(45) Date of Patent: Feb. 22, 2011

(54) METHOD AND SYSTEM TO FACILITATE MULTIPLE MEDIA CONTENT PROVIDERS TO INTER-WORK WITH MEDIA SERVING SYSTEM

(75) Inventors: Baoquan Zhang, Overland Park, KS (US); Geoff S. Martin, Overland Park, KS (US); Jay S. Harmon, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 580 days.

(21) Appl. No.: 11/501,284

(22) Filed: Aug. 8, 2006

(51) Int. Cl.
*H04W 4/00* (2009.01)

(52) U.S. Cl. ............ 455/466; 455/403; 455/418; 455/419; 455/420; 709/200; 709/202; 709/219; 709/246

(58) Field of Classification Search ........... 455/401, 455/407, 412.1–414.4, 466, 403, 418–420; 725/135; 209/200, 219, 246
See application file for complete search history.

(56) References Cited

U.S. PATENT DOCUMENTS

| | | | | |
|---|---|---|---|---|
| 6,466,975 B1 * | 10/2002 | Sterling | | 709/223 |
| 6,622,016 B1 * | 9/2003 | Sladek et al. | | 455/414.1 |
| 6,925,307 B1 * | 8/2005 | Mamdani et al. | | 455/466 |
| 7,006,608 B2 | 2/2006 | Seelig et al. | | 379/88.22 |
| 7,171,477 B2 * | 1/2007 | Hori et al. | | 709/227 |
| 7,277,691 B1 * | 10/2007 | Lundy et al. | | 455/401 |
| 2001/0011222 A1 * | 8/2001 | Mclauchlin et al. | | 705/1 |
| 2002/0007374 A1 * | 1/2002 | Marks et al. | | 707/513 |
| 2002/0107985 A1 * | 8/2002 | Hwang et al. | | 709/246 |
| 2003/0002657 A1 | 1/2003 | Seelig et al. | | 379/373.01 |
| 2003/0032409 A1 * | 2/2003 | Hutcheson et al. | | 455/414 |
| 2003/0086558 A1 | 5/2003 | Seelig et al. | | 379/373.01 |
| 2003/0109248 A1 * | 6/2003 | Lewis | | 455/412 |
| 2003/0153302 A1 * | 8/2003 | Lewis et al. | | 455/412 |
| 2004/0114732 A1 | 6/2004 | Choe et al. | | 379/88.17 |

(Continued)

OTHER PUBLICATIONS

ECT European Computer Telecoms, "Ring Back Tone from ECT", http://www.ect-telecoms.de/pdf/ringBackTone.pdf#search=%22-ECT%20Ring%20Back%20Tone%20from%20ECT%22 (Feb. 2005).

(Continued)

*Primary Examiner*—Kamran Afshar
*Assistant Examiner*—Chuong A Ngo (57) ABSTRACT

Methods and systems are disclosed for integrating a plurality of providers of media content such as call tones, games, ringers, etc. with a wireless service provider network. The wireless service provider network includes a media service platform, a profile database and a media database. The media content providers provide an interactive facility, e.g., Web interface, allowing a user to purchase content. A notification message is sent to the user which is triggered in response to purchase of content. The notification message includes a network address (e.g., URL) of the media service platform. The media service platform checks to see if the purchased content is stored in the media database, and if not, it pulls it over from the content provider. The profile database is updated regarding the purchased content in response to information from the user.

14 Claims, 6 Drawing Sheets

U.S. PATENT DOCUMENTS

| | | | |
|---|---|---|---|
| 2005/0105706 A1 | 5/2005 | Kokkinen | 379/201.01 |
| 2005/0172033 A1* | 8/2005 | Mathew et al. | 709/246 |
| 2005/0193094 A1* | 9/2005 | Robbin et al. | 709/219 |
| 2005/0245240 A1* | 11/2005 | Balasuriya et al. | 455/414.1 |
| 2006/0003780 A1* | 1/2006 | Mamdani et al. | 455/466 |
| 2006/0015580 A1* | 1/2006 | Gabriel et al. | 709/219 |
| 2006/0085521 A1* | 4/2006 | Sztybel | 709/219 |
| 2006/0098801 A1 | 5/2006 | Hahm et al. | 379/257 |
| 2006/0109970 A1 | 5/2006 | Shim et al. | 379/207.16 |
| 2006/0135158 A1 | 6/2006 | Lee et al. | 455/435.1 |
| 2006/0178986 A1* | 8/2006 | Giordano et al. | 705/40 |
| 2006/0218226 A1* | 9/2006 | Johnson et al. | 709/202 |
| 2006/0264209 A1* | 11/2006 | Atkinson et al. | 455/422.1 |
| 2007/0287477 A1* | 12/2007 | Tran | 455/466 |

OTHER PUBLICATIONS

HP Invent "Personalized Ring-Back Tones", technical documentation http://docs.hp.com/enJ8538-90003/ch01s03.html, Jun. 27, 2006.

Convergelabs "PreferRing™", Personal Ring Back Tone, available at the Internet Archives (www.archive.org) using the website: www.convergelabs.com/CL%20PreferRing%20PRBT%20Brochure_General%20Features.pdf#search=%22convergelabs%20PreferRing%20personal%20ring%20back%20ton%22 (Dated May 13, 2005).

* cited by examiner

METHOD AND SYSTEM TO FACILITATE MULTIPLE MEDIA CONTENT PROVIDERS TO INTER-WORK WITH MEDIA SERVING SYSTEM

BACKGROUND

A. Field

The invention relates to providing "ringback" media, e.g., tones, music, speech or other media, to a caller's phone. Ringback is the ringing or other sound that a caller hears while waiting for the called party to answer the phone. As one example, the invention relates to systems and methods for facilitating multiple ringback content providers to inter-work with a ringback media system. The methods of this disclosure are also applicable to providers of other types of media content and allow such providers to inter-work with a media serving system.

B. Related Art

In traditional phone systems, a switch in telephone network plays a ringback tone in the form of call tones to the calling party. The switch may be at caller's end of the call or at the called party's end of the call. The provision of call tones to a calling party is sometimes referred to in the art as "call tones service."

In this respect, call tones service is different from some other services, such as customized ringers, screensavers, games and applications etc. In these other types of services, the end device (typically a mobile device which includes telephone functionality) downloads a specific type of media/information, and then runs it from the end device. For example, for ringers, the mobile device downloads the particular ringer media from a network based server, and then the user can use the ringer by assigning it to callers or call types.

Call tones service, as noted above, is usually network-based. That is, call tones media is played from a network device (typically, a call tones server) not the end device. The call tones are packetized from a call tones server and transmitted over a communications network to the end device calling party. (Call tones are packetized if Voice over Internet Protocol (VoIP) technology is involved. Currently most call tones systems are TDM-based. In a non-VoIP scenario, the call tones would be transmitted the same way as traditional TDM voice signals). In some instances, the call tones server is operated by the third party provider of the call tones content. Regardless of whether the call tones server is operated by a wireless service provider or a third party content provider, downloading of call tones to the end device is unnecessary. However, it does introduce some special complexities. Such complexities can be due to the fact that call tones media may be provided by multiple independent call tones content providers. In other words, the source of the call tones may be a third party which is independent from the entity providing telephone services (e.g., Sprint Nextel). There is a need for the call tones system (i.e., the telecommunication system providing call tones to end devices) to inter-work with multiple content providers that sell the call tones content.

In a current method of operation, the call tones systems usually have a content management interface from where call tones contents are either manually or automatically provisioned. The call tones are supplied by a particular content provider that has contracted with the call tones service provider. Alternatively, the call tones service provider may choose to perform the content management function itself. Under this method, the call tones users usually access a call tones catalog and make purchases of call tones content via an interactive interfaces provided by the call tones system. Such interface may take the form of a web interface, interactive voice response unit (IVR), or via short message service (SMS) or wireless application protocol (WAP) messaging.

The current approaches have several limitations. In the first scenario of a contracted call tones content provider, the call tones contents are statically provisioned by the content providers. In the second scenario, where the call tones system provides a catalog, the call tones users are restricted to access the call tones catalog and make purchases from the web/WAP/IVR/SMS interfaces provided by the service provider. The limitations restrict the call tones users to the available contents set by the service provider, and limit call tones browsing and purchasing to be in the service provider's domain.

The present disclosure provides a much more flexible and extensible approach to providing call tones services for calling parties, and allows many more call tones to be available to the user. The disclosure is also applicable other media that can be hosted on a network for mobile devices, including ringers, screen savers and games.

SUMMARY

In a first aspect, a method of integrating a call tones content provider with a call tones service provider is provided. The call tones content provider has an interactive facility such as a Web presence or IVR call system allowing a user to purchase call tones content. The call tones service provider includes a call tones service platform, a profile database and a call tones database. The method includes the steps of providing a notification message to a user in response to the user purchasing a call tone from the call tones content provider. The notification message includes a network address of the call tones service platform, the network address facilitating the user accessing the call tones service platform, e.g., by clicking on a link presenting the network address. An identification of the purchased call tones is provided to the call tones service platform, for example when the user navigates to the call tones service platform. The platform determines whether the purchased call tones is stored in the call tones database. If the purchased call tones is not stored in the call tones database, the call tones service provider updates the call tones database to include the purchased call tones, e.g., by pulling the content over from the content provider. The profile database is updated to include assignment of the purchased call tones in response to information from the user.

The method can be applied to other media besides call tones that is purchased from third parties, such as games, screen savers, customized voice mail message, celebrity voices, ringers, etc. The media content providers have a facility such as a Web presence allowing a user to purchase content. A notification message is sent to a user in response to the user purchasing media from the media content provider. The notification message includes a network address of a media service platform. The network address facilitates the user accessing the media service platform, e.g., by clicking on a link presenting the network address. An identification of the purchased media is provided to the media service platform, for example when the user navigates to the media service platform. The platform determines whether the purchased media content is stored in a media content database. If the purchased media content is not stored in media content database, the media service platform updates the call tones database to include the purchased media, e.g., by pulling the content over from the content provider. The profile database is updated to include assignment of the media in response to information from the user.

In yet another aspect, a media service provider system is disclosed comprising a platform for use in providing media services for subscribers, a profile database for the subscribers, and a database of media content. The platform includes memory storing a set of instructions executable by the platform. The instructions provide for: a) determining whether content purchased by the subscribers is located in the database of media content, b) obtaining media content from the third party media providers in the event that the content purchased is not in the database; and c) updating the profile database regarding the purchased media in response to information from the subscriber.

In still another aspect, a system is disclosed for providing media content to a subscriber of wireless communications services, comprising: a plurality of media content providers, each having an interactive facility facilitating purchase of media content by a subscriber; and a media service provider platform operated by a provider of wireless communications services. The media content provider sends a notification message to the subscriber when the subscriber completes a media purchase transaction. The notification message includes a) a network address of the media service provider platform, the network address facilitating the subscriber accessing the media service provider platform; b) an identification of the purchased content, and c) information identifying the media content provider.

These and still other aspects of the invention will be more fully explained in the following detailed description and with reference to the drawings.

DETAILED DESCRIPTION OF PREFERRED EMBODIMENT

Figure 1:
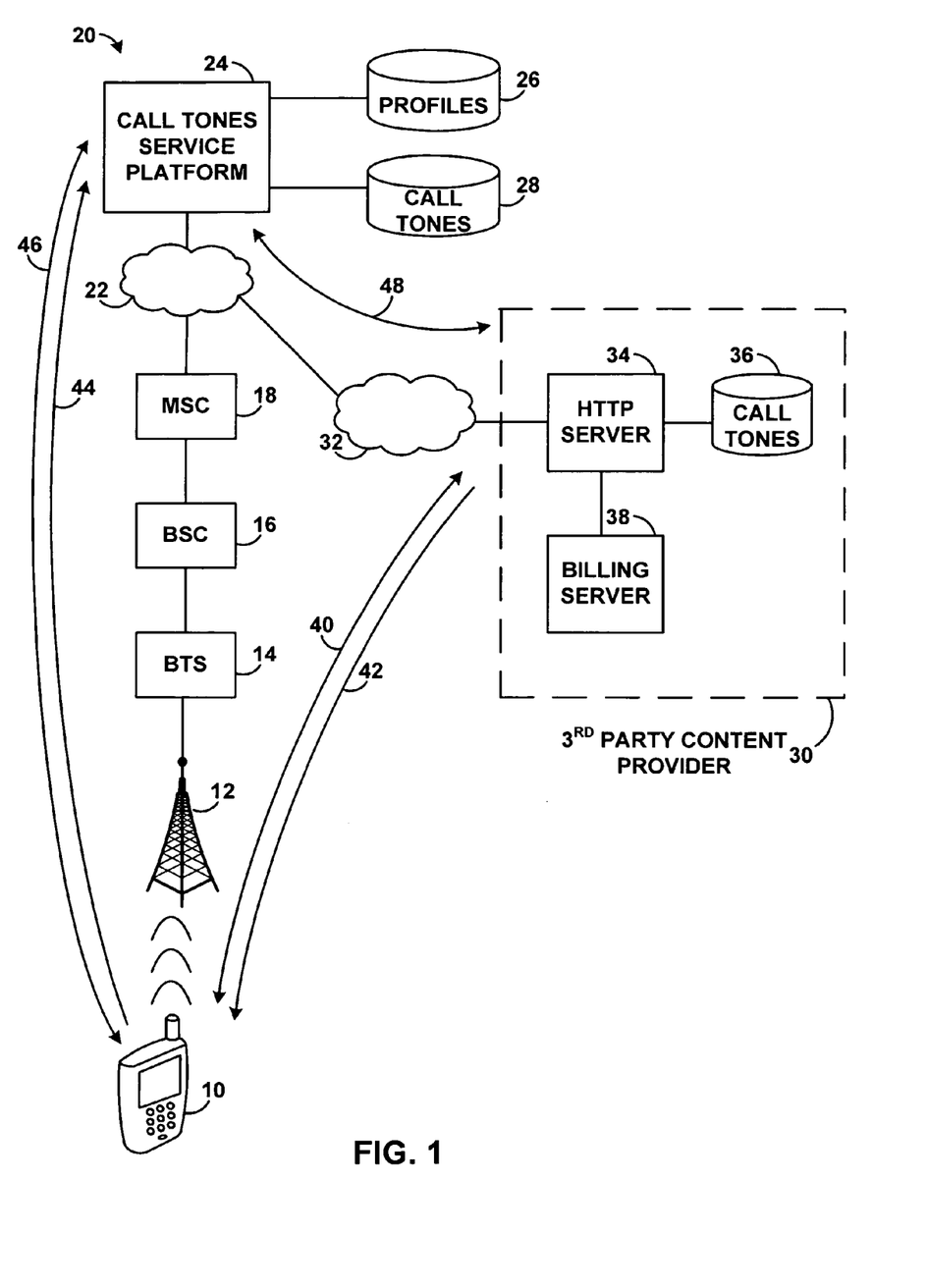
FIG. 1 is a block diagram of a system facilitating multiple call tone content providers to inter-work with a call tones system, with the arrows showing message flows that occur when a user operating a mobile device purchases call tones content from a third party call tone provider.

FIG. 1 is a block diagram of a system facilitating a call tone content provider 30 to inter-work with a call tones system 20. The basic idea of FIG. 1 is to provide a mechanism for a user of a telephone 10 to purchase a call tone from a content provider 30 and provide a convenient method for have the call tones system 20 to update a profile for the user of the phone 10 to include the newly-purchased content. The system and method of FIG. 1 allows the call tones system 20 to readily extend to include different call tones which may be offered by third party content providers 30, and to keep the user profile current when new content is purchased.

Figure 2:
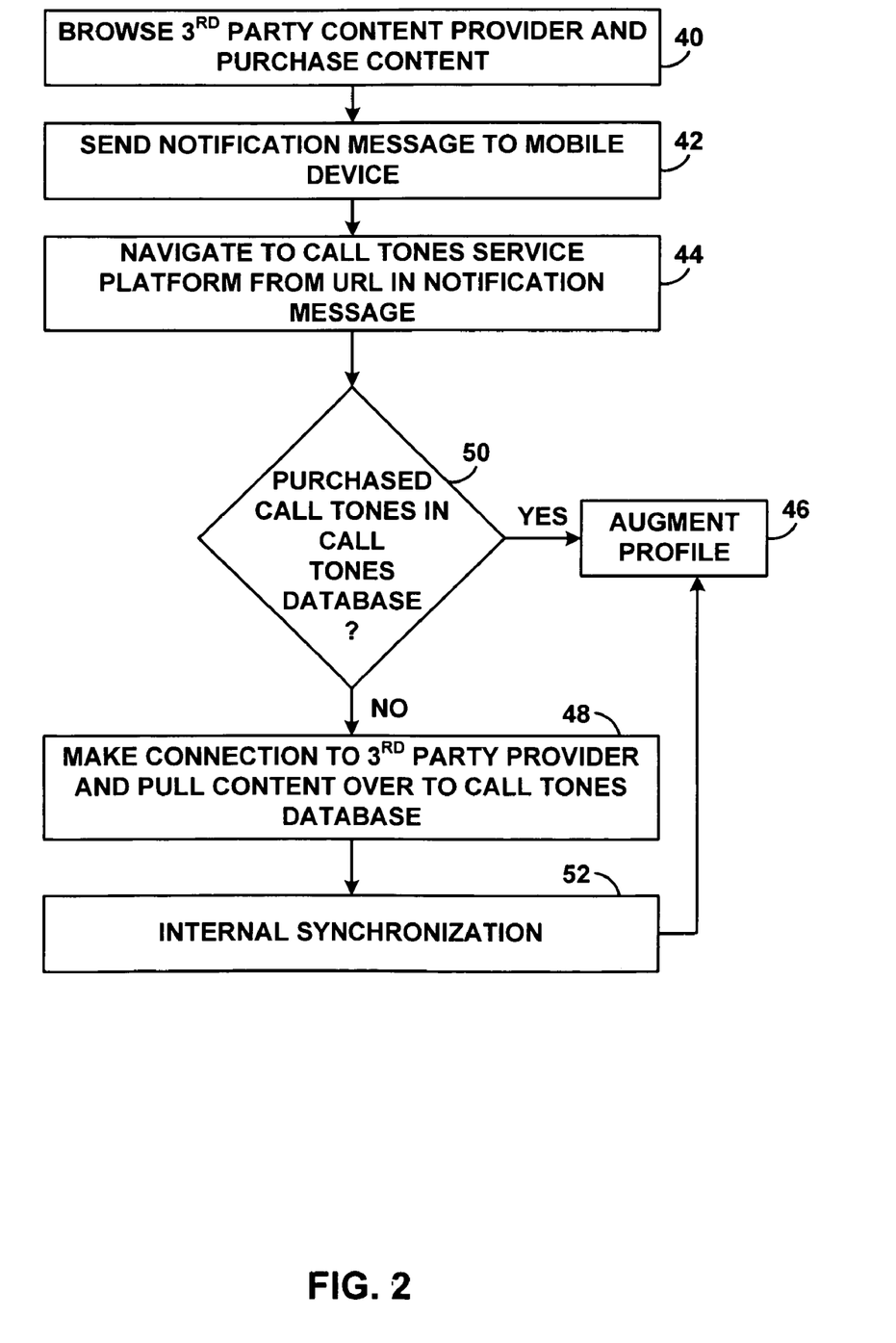
FIG. 2 is a flow chart showing the messaging flow of FIG. 1 in greater detail.

Only one call tones content provider 30 is shown in FIG. 1, it being understood that the principles of operation shown and explained in FIGS. 1 and 2 and be applied to other content providers. The arrows 40, 42, 44, 46 and 48 in FIG. 1 show message flows that occur when a user operating a mobile device 10 purchases call tones content from a third party call tone provider 30. The explanation of the message flows 40, 42, 44, 46 and 48 are further explained in FIG. 2.

While the following discuss is in the context of call tones, the system of FIG. 1 can be extended to purchases of other types of media content from third party providers, such as games, voice mail messages, etc. This aspect will be described subsequently in conjunction with FIG. 5.

The telephone 10 may take the form of a cellular telephone, personal digital assistant, palm computer, or other equivalent device with phone functionality. The phone could also be a land-line phone. The present discussion will refer to the phone 10 as one which is used by a subscriber of wireless telephone services, such services provided by a a wireless service provider which manages the call tones system 20. The illustrated phone 10 therefore includes an antenna and processing circuitry for engaging in RF communications with a wireless network infrastructure having an antenna 12, base transceiver station 14, base station controller 16 and a mobile switching center 18. These details are conventional and known in the art, e.g., in IS-41 wireless networks. The MSC 18 is connected to a wireless service provider network 22, which may take the form of a wide area packet-switched network.

The call tones system 20 includes a call tones service platform 24, a profiles database 26 and a call tones database 28. The call tones service platform 24 may take the form of a general purpose computing platform which is connected to the network 22. It is programmed with instructions for communicating with the device 10 as described herein to update a call tones profile for the user in the profiles database 26. The profiles database 26 is a database which stores information associating call tones with particular callers. The call tones database 28 is a database containing call tones media files. In an alternative configuration, the database 28 stores information identifying particular call tones (such as ID numbers or names for them), but does not store the actual media files. In the event that the user of the device 10 purchases a call tone that is not currently stored in the database 28, the call tones service platform obtains the call tone media file directly from the third party content provider 30.

The service provider network 22 is coupled via one or more intermediate networks 32 to the third party content provider 30. The network 32 may be the Internet, for example. The third party content providers have a presence on the Internet, by means of an HTTP web server 34 which serves web pages describing call tones content available for purchase. The content provider 30 may include a call tones database 36 storing content media files. The provider 30 may also include a billing server 38 for storing purchase transaction information. Such purchase transaction information may be furnished to a billing server (not shown) of the wireless service provider for purposes of billing content that is purchased.

The operation of the system of FIG. 1 provides a method of integrating a call tones content provider 30 with a call tones service provider, in this example a wireless service provider. The method will be discussed in conjunction with the arrows 40, 42, 44 46 and 48 of FIG. 1 and the flow chart of FIG. 2.

As indicated by the arrows 40, the user of the device 10 launches the web browser on the device, acquires Web connectivity using the wireless network infrastructure 12, 14, 16, 18, and navigates to the home page of the call tones content provider 30. The arrows 40 indicate the exchange of web page requests and responsive content by which the device 10 accesses and purchased content from the third party provider 30. The manner in which the call tones content is browsed and purchased is not particularly important. The purchase transaction is logged by the billing server 38 and reports of call tones content purchases are furnished to the wireless service provider, e.g., to the profiles database 26 or to a separate billing system managed by the wireless service provider. Alternatively, such billing could be by credit card, by deduction in value from a calling card, or by any other means.

Figure 4:
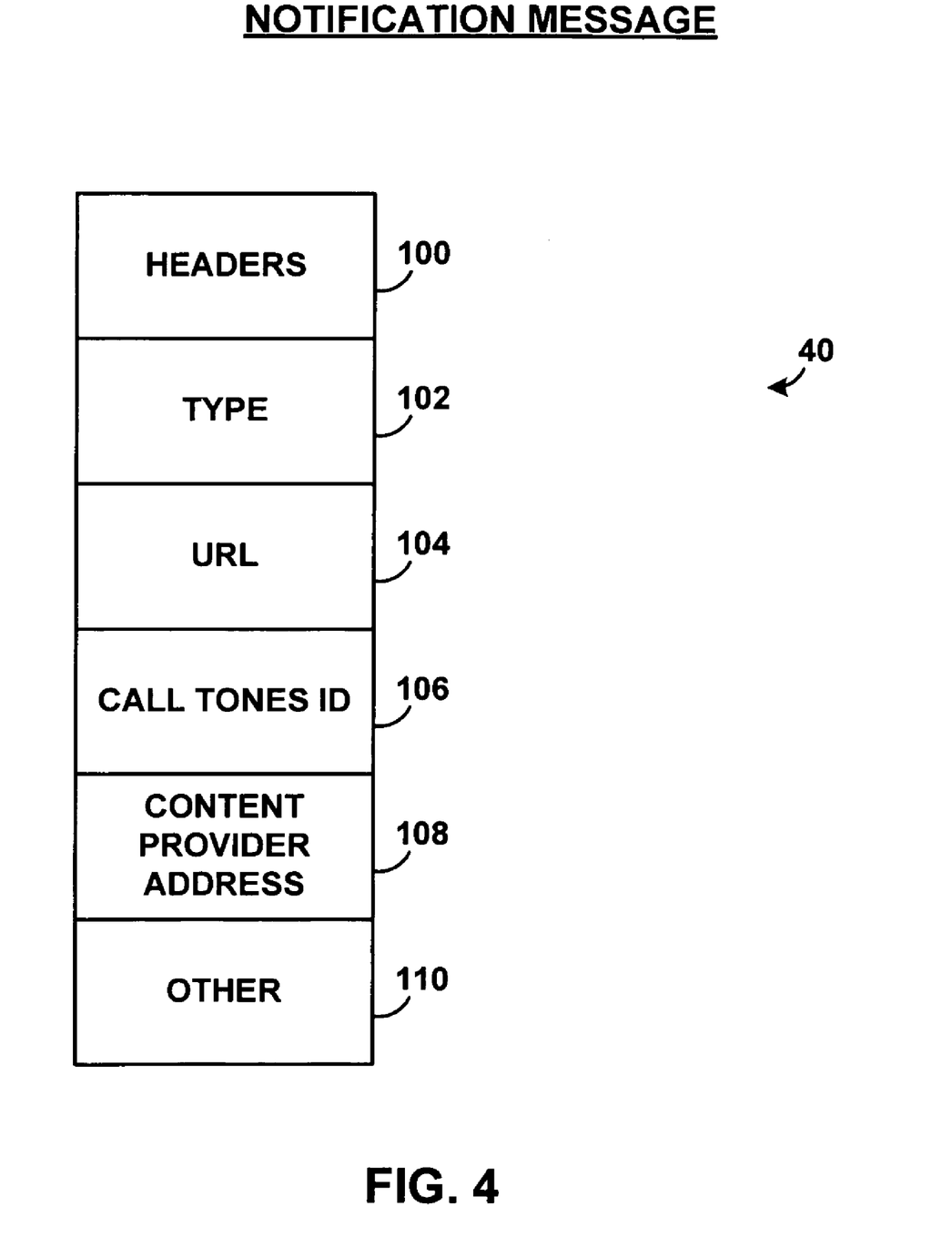
FIG. 4 is a block diagram of an example of the notification message of FIGS. 1 and 2.

As indicated by arrow 42, a notification message is sent from the content provider system 30 (e.g., by web server 34) to the device 10. The notification message is triggered by the completion of a purchase transaction. One example of a notification message 40 is shown in FIG. 4 and will be described subsequently. The notification message is preferably in electronic form, and may take the form of a Short Message Service (SMS) or Multimedia Message Service (MMS) message, email, or other form. The format of the message 40 is not particularly important, and can vary widely. The notification message 40 preferably includes several different elements. First of all, the notification message includes a network address, e.g., Uniform Resource Locator (URL) of the call tones service platform 24. The URL, which may be presented on the device 10 as a link on the device 10 user interface, facilitates the subscriber accessing the service platform 24 for the purpose of updating the user profile 26 with the new content, for example by clicking on the link. The message 40 also preferably includes an identification of the purchased content, such an ID number, name, etc. of the content. This identification is provided to the platform 24 when the device 10 connects to the platform 24, e.g., as an action that occurs automatically after the phone has established a connection to the platform 24. The notification message 40 also preferably includes information identifying the media content provider, either directly or indirectly. An example of a direct identification of the content provider is inclusion of the content provider name in the message 40. An example of indirect identification of the content provider is inclusion of a unique network address (e.g., URL) of the content provider.

After the notification message 40 is received by the phone 10, the phone's browser (or other application) opens the message, and displays the URL of the call tones service platform 24 which was included in the message 42. As indicated by step 44 in the flow chart of FIG. 2, the user navigates to the call tones service platform by clicking or selecting the displayed URL. When the user navigates to the call tones service platform, the identify of the purchased call tone is provided to the call tones service platform 24.

At step 50 in FIG. 2, the platform 24 determines whether the call tones that were purchased are in the call tones database 28. If so, the process proceeds to step 48 wherein the user profile 26 is updated to indicate the assignment of the call tones to particular calling numbers in response to instructions and information received from the phone 10. The exchange of query and responses to indicate how the call tones are to be provisioned are also indicated by the arrow 46 in FIG. 1.

If, at step 50, the call tones are not in the database 28, the call tones service platform 24 makes a connection to the third party content provider 30 system and pulls the content over to the call tones database, as indicated by the arrows 48 in FIG. 1 and step 48 in FIG. 2. Recall that the identity of the call tones provider, e.g., its network address, was supplied to the phone 10 in the notification message 42. The identification is further provided to the call tones service platform 24 when the user of the phone 10 navigates to the platform 24 in step 44. Thus, the platform 24 is supplied with an address by which it may connect to the call tones service platform and request transmission of the call tones file. The call tones media file obtained by the provider 30 (e.g., from call tones database 36) is stored in the call tones database 28.

In one optional embodiment, the service platform includes a facility for performing a screening function for purchased call tones. The facility for screening is basically a mechanism for determining whether the call tone content contains objectionable matter (e.g., profanity). The call tones service provider may conduct such screening automatically, e.g., by using speech recognition algorithms to look for speech patterns in the call tones. As another example, the platform 24 may include a graphical user interface and speakers which allows a human operator to screen call tones. The service provider system 20 has an interest in preventing objectionable call tones from being played on its system. In either case, the final authorization of the call tones purchase from the third party content provider site would typically be after the screening process is completed successfully, i.e., the call tones service provider system 20 has allowed the purchase. Alternatively, the call tones service provider system 20 screens all the third party offered content before it is offered on the content provider website, e.g., pursuant to an appropriate provision in a service level agreement (SLA) between the service provider and the third party content provider.

At step 52, an internal synchronization takes place between the call tones database 28 and remotely located run-time sites where call tones are played during calls. Recall that call tones service platform 24 is essentially a "back end" centralized data center system and associated profile and call tones databases, and during a call the call tones can be served from separate run time sites (see FIG. 6, run time sites 70 and attached call tones database 28A). The service platform 24 can be considered as backend for billing, provisioning, content management and customer Web/WAP access purposes. The run time sites 70 are for real time call handing and tone play purposes. Thus, at step 52 in FIG. 2, there is a synchronization process where the call tones data at the call tones service platform database 28 and the run time sites 70 database 28A are synchronized. As noted previously, the content fetching from the third party content providers is a function of the service platform 24. After this is done, synchronization would need to occur between data center system and the run time sites (i.e., an internal process), in order to make sure that the call tones are played to calling parties in accordance with the profile as soon as possible after the profile is updated in the database 26.

After synchronization occurs at step 52, the process proceeds to the augment profile step 46, wherein the user of the phone 10 provides instructions to the service platform 24 as to assignment of the call tones to calling parties.

Figure 3:
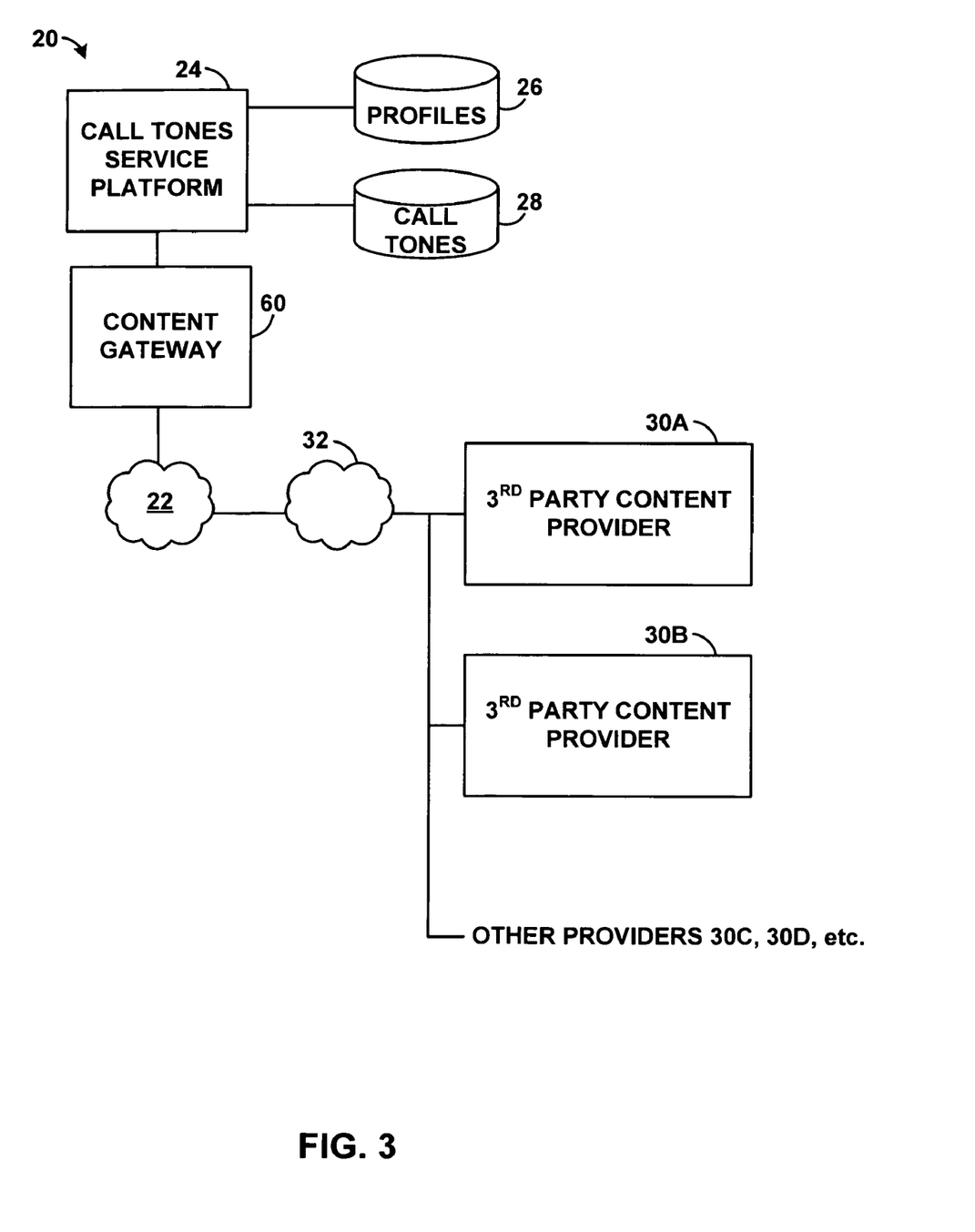
FIG. 3 is a variation on the embodiment of the system of FIG. 1, showing a contents gateway within the call tones system; communications from the call tones service platform to the third party providers proceeds through the contents gateway.

FIG. 3 shows a variation on the embodiment of FIG. 1. In FIG. 3, the call tones system 20 includes a content gateway 60. The content gateway may take the form of a router. Communication between the call tones service platform 24 and the call tones content providers is routed through the content gateway 60. FIG. 3 also shows multiple third party content providers 30A, 30B, 30C etc. Each of these content providers has a presence on the Internet 32 and can be accessed by the call tones service platform 24 and content gateway 60 using HTTP, FTP, or other networking protocol.

FIG. 4 shows one possible example of a notification message 40 which is triggered for transmission by the third party content provider in response to a media purchase transaction. The message 40 includes a plurality of fields, including headers 100 such as source and destination addresses, the format which may vary depending on the protocol used. A type field 102 identifies the type of message and will be used by an application running on the phone 10 to handle the message according to the description in this document. The field 104 includes the network address (URL) of the call tones service platform 24. Field 106 includes an identification of the purchased call tones (or other media, e.g., ringer, voice mail message, etc.). Field 108 includes the address (URL) of the third party content provider. Optional field 110 is for other purposes, such as checksum, etc. The information in field 104 is displayed on the phone 10 to provide a link to the service platform 24, which the user may activate as indicated in step 44 to establish a connection to the service platform 24. When this connection is made, the information in the field 106 and the field 108 is forwarded automatically to the service platform and used as described previously.

Applications for Other Types of Media Content Besides Call Tones

While the above example has been in the context of call tones, the principles and methods of FIGS. 1 and 2 are applicable to other types of media. Consider for example the system of FIG. 5. There may be multiple content providers of each type of media, such as for example ringers content providers 200A . . . 200N, screen savers content providers 202A . . . 202N, games providers 204A . . . 204N, and other media providers 206, such as providers of call tones, celebrity voices, voice mail messages, or other media. The process of purchasing content from any of the content providers 200, 202, 204, 206 is the same as explained above in FIGS. 1 and 2. Each content provider provides a notification message to the phone 10 when the purchase transaction is completed. The user then clicks on the link contained in the notification message and navigates to a media service platform 24. The media service platform 24 determines whether the purchased media is present in the media database 28. If so, they provision the media in response to instructions received from the phone 10. If not, they obtain the content from the media content providers 200, 202, 204, 206. They then undergo an internal synchronization with real time run sites (not shown in FIG. 5, but present as shown in FIG. 6). The user profile database 26 is then updated in response to information from the phone.

Figure 5:
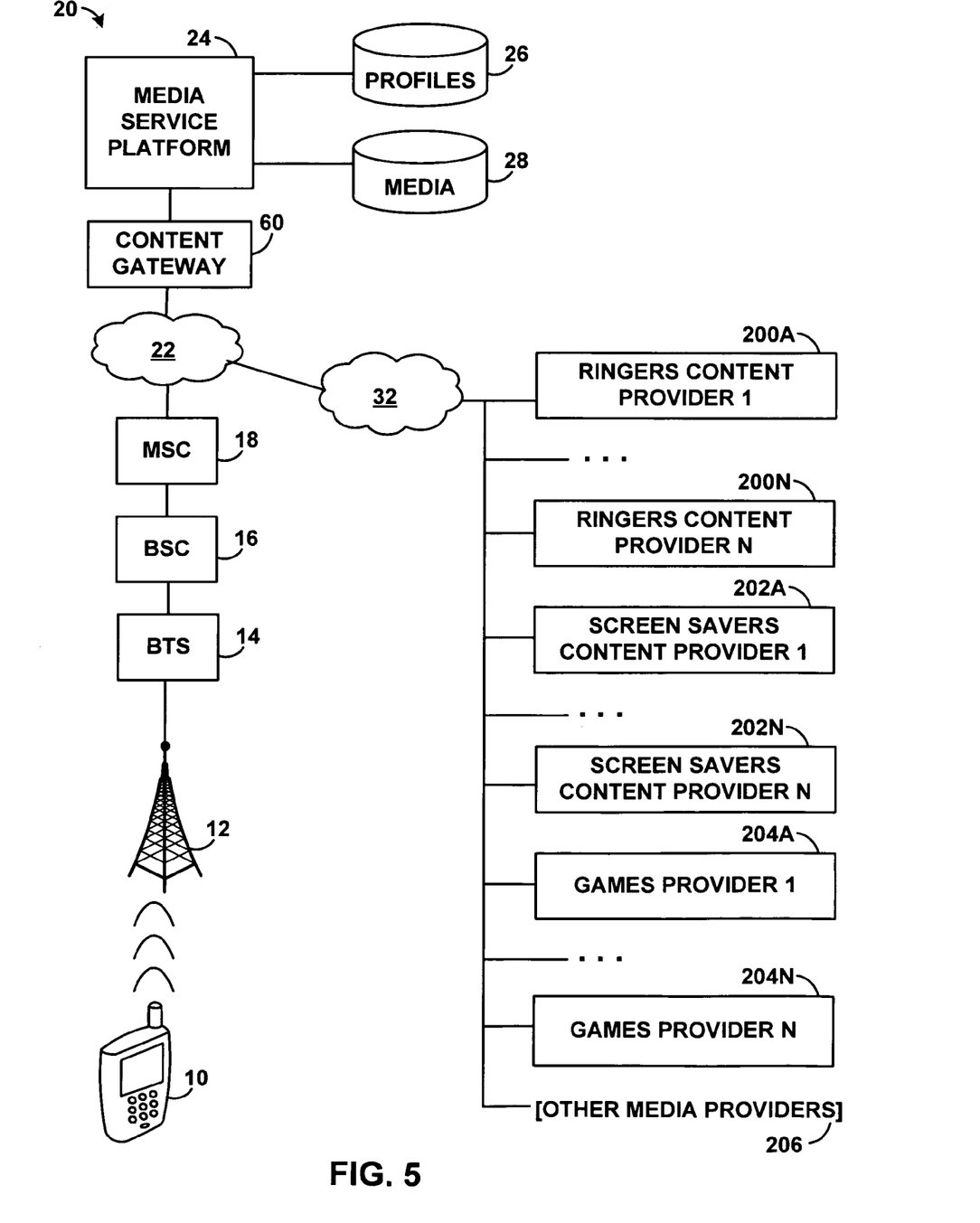
FIG. 5 is a block diagram of a system for facilitating multiple content providers to inter-work with a media service provider platform. The operation of the system of FIG. 5 may include the features of FIGS. 2 and 4, for different types of media, including ringers, games, screen savers, celebrity voices or other type of content.
Figure 6:
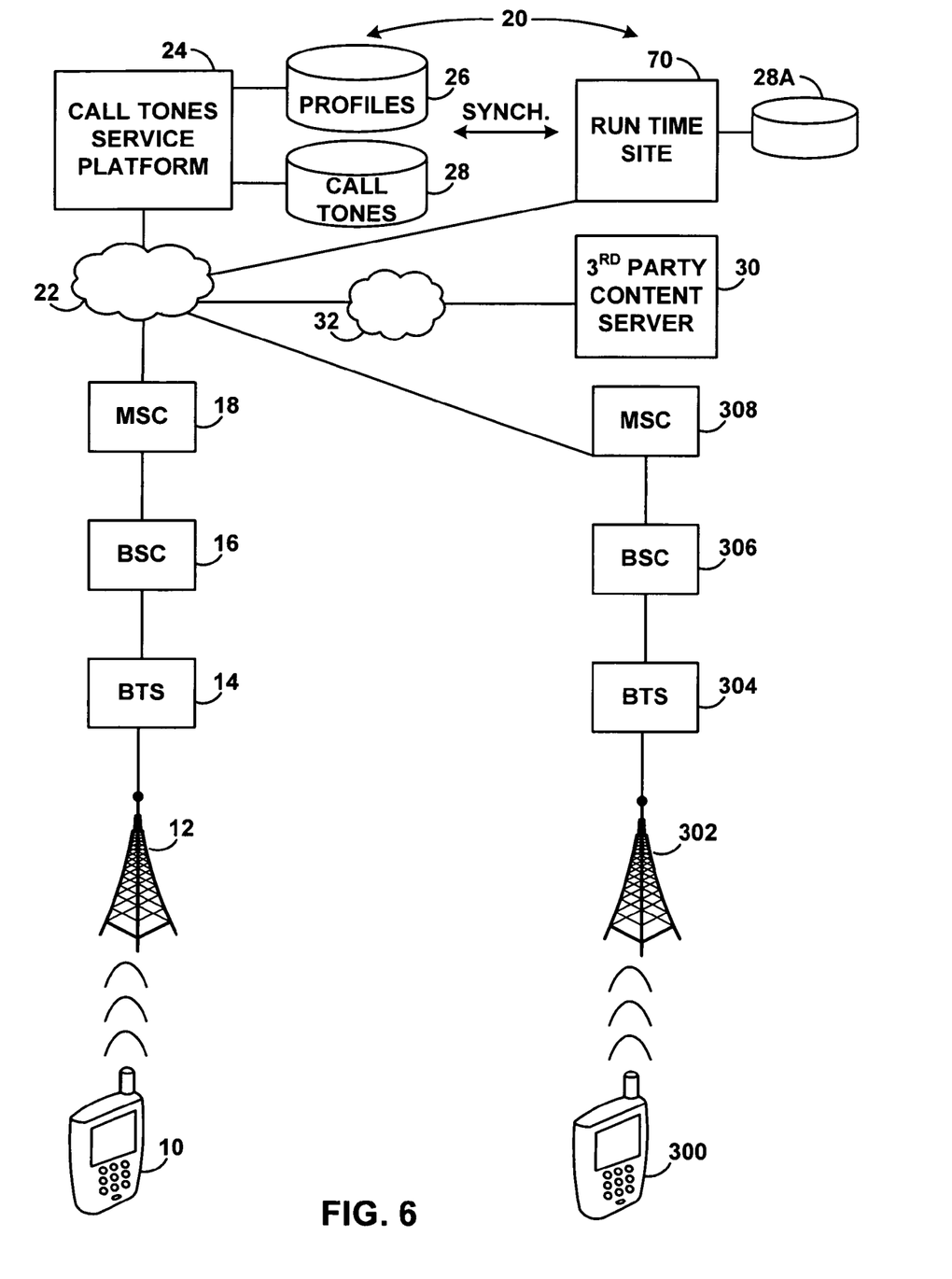
FIG. 6 is a block diagram showing the system of FIG. 1 showing a run time site which is used to play call tones content during a call.

Note that the embodiment of FIG. 5 includes a content gateway. Communications between the media service platform and the content providers 200,202, 204 and 206 is transmitted through the content gateway 60.

The embodiment of FIG. 5 may also include a facility at the media service platform 24 which performs a screening of media content to determine whether it includes objectionable matter, as described above.

Media content is served to a calling or called party from the run time sites 70 (FIG. 6) during a call. It will be appreciated that the architecture of FIGS. 5 and 6 basically brings the media content within the network 22 of the service provider (i.e., provider of wireless telecommunication services). The service provider may have media played by its own internally configured run time sites 70 (FIG. 5) during a call. Only in the situation where the run time sites do not have the media stored locally does the service provider have to have the media played by the third party content provider.

While presently preferred and alternative embodiments have been described, variation from the illustrated embodiments is possible without departure from the scope of the invention. The scope is to be determined by reference to the appended claims.

We claim:

1. A method of integrating a call tones content provider with a call tones service provider, the call tones content provider providing a facility allowing a user to purchase call tones content and the call tones service provider including a call tones service platform, a profile database and a call tones database, comprising the steps of:

provi ding a notification message to a user in response to the user purchasing a call tone from the call tones content provider;

providing in the notification message a network address of the call tones service platform of the call tones service provider, the network address facilitating the user accessing the call tones service platform;

providing an identification of the purchased call tone to the call tones service platform in response to the user accessing the call tones service platform via the network address provided in the notification message;

making a determination whether the purchased call tone is stored in the call tones database of the call tones service provider;

responsive to the determination of the purchased call tone not being stored in the call tones database, the call tones service provider (i) connecting to the call tones content provider, and (ii) updating the call tones database to include the purchased call tone; and updating the profile database of the call tones service provider to include assignment of the purchased call tone in response to information from the user.

2. The method of claim 1, wherein the notification message is triggered in response to a purchase transaction at the call tones content provider.

3. The method of claim 1, wherein the call tones content provider provides an interactive interface for purchasing call tone, and wherein the network address contained in the notification message comprises a Uniform Resource Locator address.

4. The method of claim 1, wherein the call tones service provider further includes a content gateway and wherein communication between the call tones service platform and the call tones content provider is routed through the content gateway.

5. The method of claim 1, further comprising the step of determining whether call tones contains objectionable matter.

6. The method of claim 1, wherein the call tone is ringback media provided to a caller while waiting for a called party to answer.

7. The method of claim 1, wherein the call tone is not downloaded to a client device of the user.

8. The method of claim 1, further comprising synchronizing call tones data at the call tones database with a database of one or more run time sites that serve media content of the call tones data during a call.

9. The method of claim 1, further comprising the call tones service provider playing the purchased call tone.

10. A media service provider system comprising:
a platform for use in providing media services for subscribers;
a profile database for the subscribers,
a database of media content; and
a memory storing a set of instructions executable by the platform for:
a) determining whether content purchased by the subscribers is located in the database of media content, and b) obtaining media content from third party media providers in the event that the content purchased is not in the database; and c) updating the profile database regarding the purchased media in response to information from the subscriber.

11. The platform of claim 10, further comprising
a content gateway for routing messages between the platform and third party media providers.

12. The platform of claim 10, wherein the platform further comprises a facility for screening media content for objectionable matter.

13. The platform of claim 10, and wherein the media is selected from the group of media consisting of call tones, ringers, screen savers, games, voice mail messages, and celebrity voices.

14. The platform of claim 10, further comprising one or more run time sites associated with the database of media content, the run time sites serving the media content during a call.

* * * * *